US008412278B2

(12) United States Patent
Shin et al.

(10) Patent No.: US 8,412,278 B2
(45) Date of Patent: Apr. 2, 2013

(54) LIST SEARCH METHOD AND MOBILE TERMINAL SUPPORTING THE SAME

(75) Inventors: Hyun Kyung Shin, Seoul (KR); Paihonensami Viktor, Kempele (FI); In Won Jong, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 418 days.

(21) Appl. No.: 12/769,772

(22) Filed: Apr. 29, 2010

(65) Prior Publication Data

US 2010/0298034 A1    Nov. 25, 2010

(30) Foreign Application Priority Data

May 19, 2009    (KR) .................. 10-2009-0043441

(51) Int. Cl.
*H04M 1/00*    (2006.01)
*H04B 1/38*    (2006.01)
(52) U.S. Cl. ............... 455/566; 455/556.1; 715/864
(58) Field of Classification Search ............ 455/566, 455/550.1, 556.2, 556.1; 715/864; 379/93.23, 379/93.17, 142.17
See application file for complete search history.

(56) References Cited

U.S. PATENT DOCUMENTS

| | | | | |
|---|---|---|---|---|
| 5,457,738 A | 10/1995 | Sylvan | | 379/96 |
| 7,966,323 B2* | 6/2011 | Bocking et al. | | 707/731 |
| 2007/0129112 A1* | 6/2007 | Tarn | | 455/566 |
| 2008/0174570 A1* | 7/2008 | Jobs et al. | | 345/173 |
| 2008/0261569 A1* | 10/2008 | Britt et al. | | 455/414.1 |
| 2009/0005011 A1* | 1/2009 | Christie et al. | | 455/412.2 |
| 2010/0153881 A1* | 6/2010 | Dinn | | 715/825 |

OTHER PUBLICATIONS

Gelhar, Jens; Patent Application Publication No. US 2008/0046396 A1; Publication Date: Feb. 21, 2008; "Indexing Big Word Lists in Databases;".
Makus, E.J., et al.; Patent Application Publication No. US 2002/0059210 A1; Publication Date: May 16, 2002; "Displaying Hierarchical Relationship of Data Accessed Via Subject Index;".
Motaparti, Sunil, et al.; Patent Application Publication No. US 2009/0055732 A1; Publication Date: Feb. 26, 2009; "Human-To-Mobile Interfaces;".

* cited by examiner

*Primary Examiner* — Christian Hannon
(74) *Attorney, Agent, or Firm* — Cha & Reiter, LLC

(57) ABSTRACT

A list search method and a mobile terminal that implements the list search method are provided. In the list search method, a plurality of search areas for outputting a plurality of index groups respectively are output in a display area where at least one list is output. The index groups include independent indexes or indexes linked with each other. Such operation occurs without screen switching and thereby enables a mobile terminal to implement a list search quickly and easily.

18 Claims, 10 Drawing Sheets

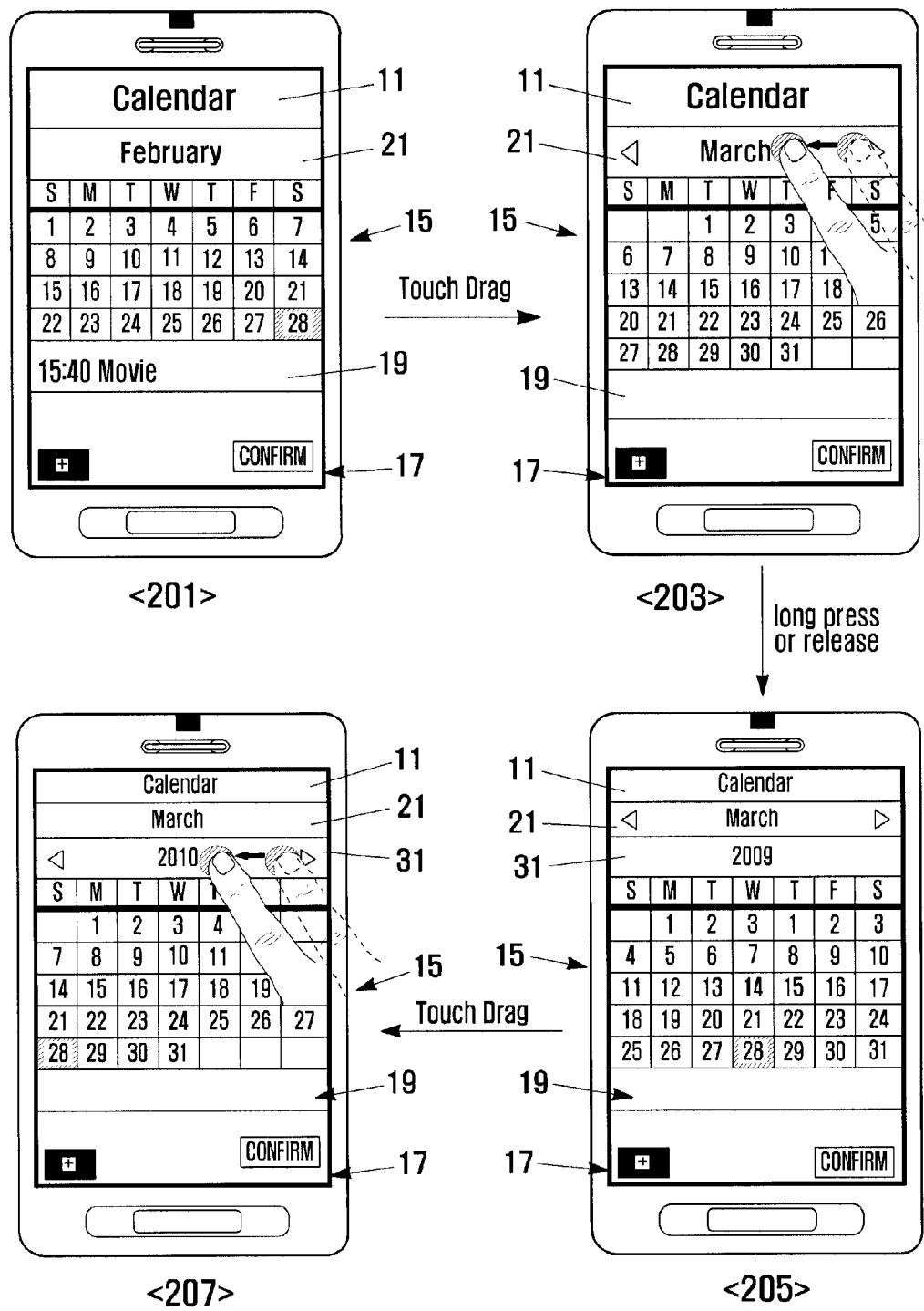

LIST SEARCH METHOD AND MOBILE TERMINAL SUPPORTING THE SAME

CLAIM OF PRIORITY

This application claims priority to and the benefit of Korean Patent Application No. 10-2009-0043441 filed in the Korean Intellectual Property Office on May 19, 2009, the entire contents of which are incorporated herein by reference.

BACKGROUND OF THE INVENTION

1. Field of the Invention

The present invention relates to a mobile terminal, and more particularly, to a list search method that implements a quick search service without separate screen switching or complex input signals using a screen search area configured to display new search indexes, based on a currently specified index, to realize faster searching of large amounts of lists, and a mobile terminal that implements the method.

2. Description of the Related Art

A mobile terminal is a terminal that supports various user functions, based on its mobility, and is used in a very wide range of fields due to its convenient use and its easy portability. In order to provide the user functions, known mobile terminal employs various input schemes. One conventional mobile terminal, for example, supports an input scheme by which certain characters or numerals can be input through a keypad or the like that is mechanically arranged on one side of the mobile terminal. Also, a mobile terminal may be limited in size for portability. In order to secure the appropriate size of a display unit, such a small-sized mobile terminal may support a touch screen with a touch panel arranged in the display unit while removing a keypad.

During known mobile terminal operation, various information input by a user and various information according to the use history of the mobile terminal can be output in a display unit. A conventional mobile terminal, for example, may collect information on call logs recorded according to radio frequency applications and output the collected information in the display unit at the request of the user. Typically, this type of call log information provided by the mobile terminal includes a minimum of several hundred lists to a maximum of several thousand lists, although the number of lists varies with terminal options. Such large volume makes it difficult to accurately locate a list desired by a user from among these numerous lists. In addition, since conventional mobile terminals perform file searching based on information input directly by the user, such direct input is problematic in that screen switching is required for the file search, and in that use of a keypad to input information is at times difficult and challenging.

SUMMARY OF THE INVENTION

The present invention is developed to overcome such problems and other shortcomings of the prior art.

The invention provides a list search method, which allows a user to quickly and easily search desired information in various file arrangement states without any separate screen switching or information input procedure, and a mobile terminal supporting and implementing the list search method.

In an embodiment, the list search method includes: displaying a list area including at least a part of at least one list; receiving an input signal for searching a specific list of the at least one list; and in response to the received signal, displaying a plurality of search areas, in each of which an index group having at least one index for searching the specific list is displayed, on a screen with the at least one list displayed thereon.

In an embodiment, a mobile terminal supporting a list search includes: a storage unit for storing at least one list; a display unit for displaying a list area including at least a part of the at least one list; a touch screen for generating a touch event for searching a specific list of the at least one list; and a control unit for receiving a signal for searching the specific list of the at least one list, and in response to the received signal, controlling the mobile terminal to display a plurality of search areas, in each of which an index group having at least one index for searching the specific list is output, on a screen with the at least one list displayed thereon.

In an embodiment, the invention includes a list search method operable in a processor within a mobile terminal. The method comprises displaying a list area on a display screen of a display unit, the list area including at least a part of at least one list, receiving a user input signal for searching a specific list of the at least one list and in response to the received user input signal, displaying a plurality of search areas, each of which including an index group having at least one index for searching the specific list, on the display screen with the at least part of at least one list displayed thereon.

In another embodiment, the invention includes a mobile terminal configured for supporting a list search. The mobile terminal includes a storage unit for storing at least one list, a display unit for displaying on a display screen a list area including at least a part of the at least one list, a touch screen for generating a touch event signal in response to a user input for searching a specific list of the at least one list and a control unit for receiving the touch event signal for searching the specific list of the at least one list, which in response to the received touch event signal, controls the mobile terminal to display a plurality of search areas, each of which including an index group having at least one index for searching the specific list, on the display screen upon which the at least one list is displayed.

BRIEF DESCRIPTION OF THE DRAWINGS

The above features and advantages of the present invention will be more apparent from the following detailed description in conjunction with the accompanying drawings, in which:

FIG. 4 is a sequence of screens that together illustrate a list search procedure based on a scheduling function according to an embodiment of the invention;

DETAILED DESCRIPTION OF THE INVENTION

Hereinafter, exemplary embodiments of the present invention are described in detail with reference to the accompanying drawings. The same reference numbers are used throughout the drawings to refer to the same or like parts. For the purposes of clarity and simplicity, detailed descriptions of well-known functions and structures incorporated herein may be omitted to avoid obscuring the subject matter of the present invention. For that matter, the terms or phrases display, displaying, displayed, list and lists may be used interchangeably herein with the terms or phrases output, outputting, output, "listed entry" and "listed entries."

While the present invention may be embodied in many different forms, specific embodiments of the present invention are shown in drawings and are described herein in detail, with the understanding that the present disclosure is to be considered as an exemplification of the principles of the invention and is not intended to limit the invention to the specific embodiments illustrated.

Figure 1:
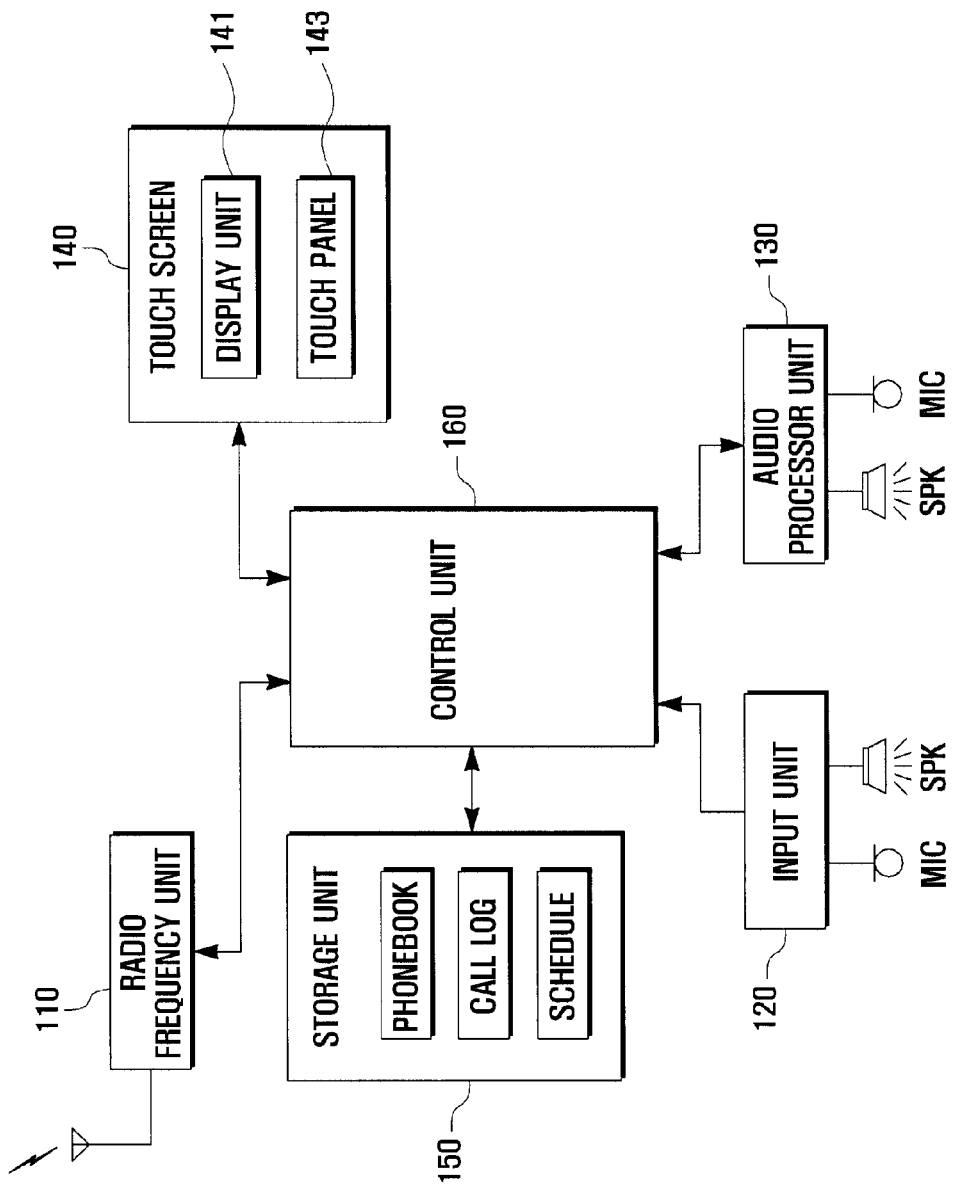
FIG. 1 is a schematic block diagram illustrating one configuration of a mobile terminal of the invention.

FIG. 1 is a schematic diagram illustrating one embodiment of a mobile terminal of the invention. Referring to FIG. 1 mobile terminal includes a radio frequency unit 110, an input unit 120, an audio processor unit 130, a touch screen 140, a storage unit 150, and a control unit 160.

The mobile terminal displays a first search area including at least one first index on a list screen with a plurality of lists arranged in a certain form when a user inputs a specific signal, for example, implementing a specific touch event in the list screen. The mobile terminal displays an additional or second search area on the list screen, based on the first index when the user specifies the first index in the first search area. The mobile terminal arranges and displays lists including the second index on the list screen when the user specifies the second index in the second search area. In this process, the mobile terminal may further display additional search areas according to user settings. Also, when the first index is specified, the mobile terminal may arrange and display lists including the first index on the list screen to update the list screen.

The radio frequency unit 110 establishes a communication channel for a voice call and a communication channel for transmission of data, such as an image, under the control of the control unit 160. That is, the radio frequency unit 110 establishes a voice communication channel, a data communication channel, and a video communication channel between mobile communication systems. To this end, the radio frequency unit 110 includes a radio frequency transmitter for frequency up-converting and amplification of a transmitted signal, a radio frequency receiver for low-noise amplification and frequency down-conversion of a received signal, and so forth.

The radio frequency unit 110 generates call log information according to the use history of the mobile terminal under the control of the control unit 160. The control unit 160 detects a phone number or phonebook information corresponding thereto from data transmitted/received through the radio frequency unit 110 and separately arranges detected information to generate call log information. The call log information includes voice call transmission/reception log information, message transmission/reception log information, missed call log information, without limitation. A user input, for example, a touch event or a key input signal allows a screen interface providing the call log information to display at least one search area for a call log search.

The input unit 120 includes a plurality of input keys and function keys for inputting numeral or character information and setting various functions. The function keys include direction keys, side keys, and shortcut keys, set in such a manner to perform specific functions. The input unit 120 generates key input signals associated with user settings and functional control of the mobile terminal, and transfers the generated key input signals to the control unit 160. This input unit 120 may be implemented by a Qwerty keypad, a 3*4 keypad, a 4*3 keypad, or the like, which includes a plurality of keys.

When the mobile terminal is configured to support the touch screen 140 in the form of a full touch screen, the input unit 120 is omitted and replaced by the touch screen 140. The input unit 120 generates a key input signal for searching a specific list according to a user input in a state where a user function including at least one list is activated. As such, the input unit 120 generates a key input signal for specifying at least one list, a direction key input signal for specifying any one of at least one index in a search area including the at least one index (which is generated as a list is specified) and a direction key input signal for an additional search area, or the like according to a user input.

The audio processor unit 130 includes a speaker SPK for reproducing audio data transmitted/received during a call and a microphone MIC for collecting a user's voice or other audio signals during a call. The audio processor unit 130 displays sound effects when a search area is output in response to a touch event or a key input signal in a screen interface including at least one list, when a plurality of indexes are specified according to a drag or direction key input signal for specifying indexes in the search area, and so forth.

The touch screen 140 includes a display unit 141 and a touch panel 143. The touch screen 140 comprises structure in which the touch panel 143 is disposed on the front side of the display unit 141. The size of the touch screen 140 is determined by that of the touch panel 143.

The display unit 141 displays information input by or provided to a user, as well as various menus of the mobile terminal. That is, the display unit 141 provides various screens according to the usage of the mobile terminal, for example, a standby screen, a menu screen, a message input screen, a call screen, without limitation. The display unit 141 displays a screen including at least one list according to the activation of a user function, a specifying effect according to the specifying of a list in the screen, a first search area including at least one first index (generated upon a lapse of a certain time after specifying the list), a specifying effect according to the specifying of a specific index included in the first search area, and a second search area including at least one second index (generated upon the lapse of a certain time after specifying the specific index).

The display unit also displays at least one list rearranged according to the specifying of the first or second index. In this process, when the number of lists associated with an index is too large to be displayed all together on one screen, the display unit 141 displays only a certain number of lists on one screen and displays a scroll bar for indicating that there are remaining lists not yet displayed.

The display unit 141 also adjusts the sizes of list display areas according to the number of lists and displays the lists in the adjusted list display areas. The display unit 141 performs screen switching from a state where all lists are arranged to a state where lists according to a specified index are arranged and outputs a screen in which relevant lists exist, which will be described in greater detail below with reference to the drawings illustrating various screens. The display unit 141 may be formed by a liquid crystal display (LCD), an organic light emitting diode (OLED), without limitation. The display unit may be smaller in size than the touch panel 143 and disposed in the low portion of the touch panel 143.

The touch panel 143 may be disposed to cover the display unit 141. The touch panel 143 generates a touch event upon the touch of an object or on an approaching distance of an object and transfers a signal representative of the generated touch event to the control unit 160. To that end, the touch panel 143 is configured in the form of a matrix and transfers information on the corresponding matrix position and touch event to the control unit 160. Touch events include a touch down event generated as an object (e.g., a finger) is touched with the touch panel, a touch up event generated as a touched object is released from the touch panel, a sweep generated by moving a touch (e.g., finger) in a given direction in a touch down state, a touch move or touch drag event, a flick event generated by accelerating and moving a touch in a given direction and the like, without limitation.

The control unit 160 checks the position information and the type of a touch event transferred from the touch panel 143, confirms a specific image of the display unit, mapped to the corresponding position and controls a function linked with the image to be activated. A user of the mobile terminal specifies a specific list in a screen interface in which at least one list is displayed and a specific display unit area for a list search by using the touch panel 143. The touch panel 143 may be set such that each list can be selected in a screen interface in which at least one list is displayed, and may set an activation area of a touch sensor in such a manner that when a search area is newly displayed, a specific index included in the search area can be selected, under the control of the control unit 160.

The storage unit 150 stores application programs necessary to operate functions. When the mobile terminal is formed with a touch screen, the storage unit 150 stores a key map or a menu map for the operation of the touch screen. Here, the key map and menu map may comprise various types, respectively. That is, the key map may comprise a keyboard map, a 3*4 key map, a Qwerty key map, or the like, and a control key map for the operational control of a currently activated application program. The menu map may comprise a menu map for the operational control of a currently activated application program or a menu map having a list of various menus provided by the mobile terminal. The storage unit 150 may include a program section and a data section.

The program area stores an operating system (OS) to boot the mobile terminal and operate the aforementioned respective constituent elements of the mobile terminal, application programs to reproduce various files and various other application programs of the mobile terminal. For example, the application programs may include an application program to support a call function according to whether or not the mobile terminal supports the call function during other functions of the mobile terminal, a web browser for access to an Internet server, an MP3 application program to reproduce various sound sources, an image output application program to reproduce various images including pictures, a moving image reproduction application program, without limitation.

The program section of the storage unit 150 includes a touch operation program to support a touch function, a search output routine capable of displaying a search area according to a screen interface that is currently being output and an arrangement routine to control the mobile terminal such that when an index included in the search area is specified, lists are rearranged based on the specified index or a page with the corresponding lists located therein is displayed.

The search routine displays a first search area including at least one first index and fetches the arrangement routine in order to arrange lists corresponding to specified lists. The arrangement routine controls the mobile terminal to arrange the full list of information related to a currently activated user function, based on an index specified in the first search area and then displays a page with the arranged full list on a screen.

When a specific index is specified in the first search area the search routine displays a second search area including at least one second index, based on the corresponding index. Also, when a specific index is specified in the second search area the search routine fetches the arrangement routine. The search routine and the arrangement routine may repeatedly perform the above step of displaying a search area including at least one index and the above step of arranging lists, based on a specified index.

The data section stores data generated from the use of the mobile terminal, phonebook information, at least one icon for a widget function and various contents. When the display unit 140 is implemented by a touch screen, the data section stores user inputs input through the touch screen. In particular, the data section of storage unit 150 stores at least one list according to user functions, for example, a call transmission/reception list, a message transmission/reception list, etc. for a call function, without limitation.

The data section stores a phonebook including a list of phone numbers input by a user, received from other mobile terminals and from a mobile communication system. In addition, the data section stores various lists, such as a picture list, a music file list, a video file list, a schedule list, and a calendar list, without limitation. These lists may be rearranged based on a specified index under the control of the control unit 160.

The control unit 160 supports an initialization procedure by controlling power supply to the respective constituent elements of the mobile terminal and upon completion of the initialization procedure, controls a signal flow between the receptive constituent elements to support a list search function. More specially, when an input signal for the activation of a user function including at least one list is generated, the control unit 160 activates the user function according to the input signal and controls the mobile terminal to display a screen interface including the at least one list on the display unit 141. The control unit 160 concurrently controls the mobile terminal to support a touch input from a user by activating the touch panel 143.

In order to support a search for any one of the at least one list, the control unit controls the mobile terminal to display a search area for a list search on the display unit 141 when a specific touch event occurs in a certain display unit area or when a specific key input signal is generated. In this case, the search area includes indexes generated from a plurality of items included in the list. When at least one index included in the search area is specified, the control unit 160 controls the mobile terminal to display a list including the specified index on the screen that is displaying the search area.

During this process, the control unit 160 controls the mobile terminal to perform list arrangement to display only lists including the specified index on the screen. Also, when a specific index in the search area is specified, and then a corresponding input signal is maintained for a predetermined period of time, the control unit 160 controls the mobile terminal display a new search area based on the specified index adjacent to the already displayed search area. The newly displayed search area includes at least one new index including the index specified in the already displayed search area. This will be described in greater detail below with reference to the drawings illustrating various screens.

As described above, the mobile terminal supports a quick and convenient list search by displaying a search area for a list search in a screen interface including at least one list, and based on an index specified in the search area, displays a new search area adjacent to the already displayed search area in the same screen interface.

The mobile terminal also has been described as displaying a search area in response to a touch event and a key input signal. But in addition, the touch event and the key input signal may include a signal corresponding to another input signal generation module capable of generating an input signal in the mobile terminal, for example, a signal corresponding to a speech signal based on speech recognition or a motion signal generated based on a motion sensor.

That is, the mobile terminal may display a first search area on a screen interface including at least one list if a user inputs a speech signal for displaying a search area, for example, a speech signal corresponding to "a list search", when the screen interface is displayed. In addition, the mobile terminal may specify a specific index included in the search area if a speech signal indicating the corresponding index is transferred, and may arrange and display lists based on the specified index. For that matter, if the user inputs a speech signal for displaying an additional search area, for example, a speech signal corresponding to "a list search within results", the mobile terminal displays a second search area adjacent to the first search area.

Moreover, if a predetermined motion signal, for example, a shaking motion signal, is generated in a state where a screen interface including at least one list is displayed, the mobile terminal displays a search area on the corresponding screen interface. Then, if a motion signal for indicating any one of indexes included in the search area, for example, a motion signal corresponding to tiling in an up-and-down direction, is generated, the mobile terminal moves a highlight box specifying an index. Subsequently, if the mobile terminal's tilt is maintained within a certain angle, and the highlight box's movement is stopped at a point in time when the mobile terminal is placed in a horizontal position, the mobile terminal determines a specified index where the highlight box's movement is stopped, and performs list arrangement, based on the specified index. Also, upon the lapse of a certain time after the specifying the index or if a signal corresponding to tilting in a certain direction (e.g. left-hand or right-hand direction) is generated, the mobile terminal displays a new search area including new indexes inclusive of the specified index. The new search area is displayed adjacent to the previously displayed search area.

Figure 2:
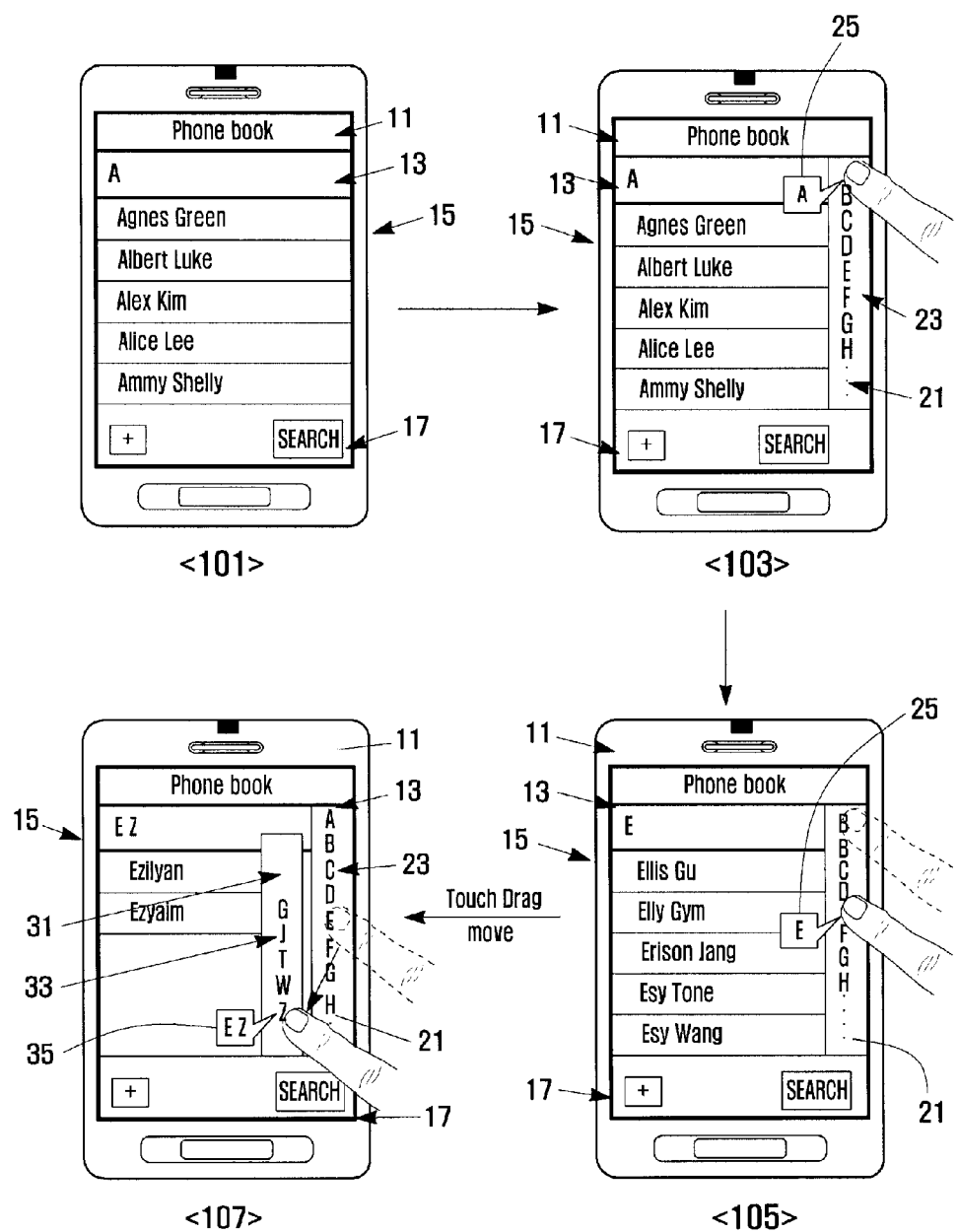
FIG. 2 is a sequence of screens that together illustrates a list search procedure according to an embodiment of the invention.

FIG. 2 illustrates a screen interface for explaining a phonebook list search function of the mobile terminal according to an exemplary embodiment of the present invention, wherein an input signal for a list search will be described based on a touch event. To this end, the mobile terminal controls touch panel 143 to be activated when a screen interface including at least one list is displayed.

Referring to FIG. 2, the display unit 141 includes a function name area 11, a list index area 13, a list area 15, and a control key area 17, as illustrated in screen "101". Here, the function name area 11 is an area in which the name of a user function of the mobile terminal is represented. That is, since the current screen interface corresponds to a phonebook function, a text associated with the phonebook function, for example, "Phone book", may be displayed in the function name area 11. The list index area 13 is an area for displaying an index related to lists displayed in the list area 15. For example, if "A" is display in the list index area 13, items related to "A" may be displayed in the list area 15. The list area 15 is an area in which items related to index information represented in the list index area 13 are arranged in a certain form. The control key area 17 is an area in which a control key for executing a function linked with an item specified in the list area 15, for example, a function of viewing detailed information on a specified item, a control key corresponding to a search button for displaying a search area, etc., without limitation, are displayed. The control key area 17 may be removed or may be assigned other control keys according to the intention of the designer of the display unit 141 or by input of settings from a user of the mobile terminal.

As illustrated in screen "101", a plurality of items related to index information disclosed in the list index area 13, that is, "Agnes Green, Albert Luke, Alex Kim, Alice Lee, Ammy Shelly, etc.", may be displayed in the list area 15. The mobile terminal may displayed only a certain number of items in the area assigned to the list area 15 and supports a scroll function allowing a search for additional items.

In screen "101", a user of the mobile terminal may request the mobile terminal to search a specific list from among a plurality of lists. The mobile terminal displays a first search area 21, which contains a first index group 23 including at least one index for a list search, in response to the generation of an input signal by the user, as illustrated in screen "103". If the user specifies an index from among indexes belonging to the first index group 23, the mobile terminal displays a separate first popup window 25 for the specified index, thereby indicating which index the user has specified. For example, when the user touches index "A" of the first index group 23, the mobile terminal displays an image or a character corresponding to "A" in the first popup window 25. The mobile terminal not only supports displaying the first search area 21 through search button activation but also displays the first search area 21 in response to various input signals. For example, the mobile terminal may display the first search area 21 when the user generates a touch event by touching the list index area 13 or even when the user touches a specific area, for example, an area with no text in the list area 15.

If the first search area 21 is displayed in screen "103", a user of the mobile terminal may generate an additional touch event in order to specify any one of indexes belonging to the first index group 23 displayed in the first search area 21. For example, after a touch down event for "A" is generated, the user may generate a touch drag event in a first direction, for example, in an up-and-down direction, while maintaining the touch down event. Then, the mobile terminal may display indexes belonging to the first index group 23, each of which the user touches according to the generation of the touch drag event, in the first popup window 25 in line with the progress of the touch drag event. Subsequently, if the user specifies index "E" by stopping the touch drag at index "E", the mobile terminal may change the list index area 13 and the list area 15, based on the specified index, as illustrated in screen "105". That is, the mobile terminal changes the current index (i.e. index "A") in the list index area 13 to the specified index (i.e. index "E"), and additionally changes the items in the list area 15 to items including index "E". With regard to this, the mobile terminal may arrange the items in alphabetical order, based on index "E".

Subsequently, the user of the mobile terminal may desire to perform a quick search through an additional search area. To this end, the user may generate a "Long Press" touch event by maintaining the touch state to specify an index in screen "105" for a long time, or generate a touch move event or a touch drag event in a second direction (e.g. left-hand direction) when wishing that a second search area 31 to be displayed. Then, the mobile terminal displays the second search area 31 including at least one specific index group, that is, a second index group 33, in an area adjacent to the first search area 21, as illustrated in screen "107".

The second index group 33 display in the second search area 31 may include independent indexes regardless of the first index group 23 displayed in the first search area 21. Also, the second index group 33 displays indexes linked with the first index group 23. That is, if index "E" is selected in the first index group 23, then the second index group 33 may include only indexes related with index "E". For example, assuming that the first index group 23 corresponds to indexes for detecting the first letters of items included in a phonebook list, and the second index group 33 corresponds to indexes for detecting the second letters of the items included in the phonebook list, the second index group 33 displayed in the second search area 21 includes only indexes for items, the first letters of which are "E" corresponding to the index specified in the first index group 23. It should be noted from the second index group 33 displayed in the second search area 31 that the items having index "E" as their first letters and stored in the phonebook of the mobile terminal have any one of "G, J, T, W, and Z" as their second letters. In this way, the mobile terminal configures respective indexes, based on items existing in search areas, in the process of displaying the first index group 23 and the second index group 33 in the respective search areas. Therefore, while all alphabets may exist in the first index group 23, the first index group 23 may be limited to include only alphabets existing based on the first letters of items. When the second index group 33 is a group including indexes corresponding to the second letters of items, the mobile terminal may extract the second letters of the items, and based thereon, configure indexes consisting of the second letters of the respective items. In this process, the mobile terminal may detect items including an index specified in the first index group 23, and extract the second letters of the detected items to configure the second index group 33, as described above.

If the user specifies any one of indexes belonging to the second index group 33 displayed in the second search area 31 by using a touch event, the mobile terminal displays the specified index, together with the index specified in the first search area 21 in a second popup window 35, as illustrated in screen "107". That is, if the user specifies index "Z" in the second search area 31, the mobile terminal displays index "EZ" in the second popup window 35.

In the above description, the list area 15 may be changed by indexes specified in the first search area 21 and indexes specified in the second search area 31. In other words, the list area 15 may display items related to each index according to a change in indexes that are specified in the first index group 23 displayed in the first search area 21, as illustrated in screen "105". That is, the list area 15 displays items having index "A" (specified in the first search area 21) as their first letters in screen "103", and displays items having index "E" (specified in the first search area 21) as their first letters in screen "105". In this process, the user of the mobile terminal may move his/her finger while generating a touch drag event from index "A" to index "E". As a result, the list area 15 displays items, the first letters of which correspond to indexes specified by the touch drag event, for example, indexes "B, C, and D". Also, when a touch event is generated for a period of time that exceeds a predetermined time for a specific index, the list area 15 may arrange and display items related to the corresponding index. That is, the list area 15 may display items related indexes "B, C, and D" according to a first setting of the mobile terminal, and may not display the related items according to a second setting of the mobile terminal.

In addition, the mobile terminal may extract only items including an index specified in the second search area 21 from among the items displayed in the list area 15 of screen "105", and configure the list area 15, as illustrated in screen "107". That is, the mobile terminal may display only items having index "EZ" as their first and second letters. The list index area 13 may display an index selected in each search area. Also, the first popup window 25 and the second popup window 35 may be shifted to and displayed in an area where a touch event is generated. Further, the mobile terminal may display a first index in the first popup window 25, in a capital letter, and display first and second indexes in the second popup window 35, in a capital letter and a lowercase letter respectively.

As described above, the phonebook list search method makes it possible for a user to conduct a quick search by providing a plurality of search areas without screen switching, and can definitely display which index a user is indicating by using popup windows in order to improve the size limit of a display unit applied to a mobile terminal in the process of a list search.

Figure 3:
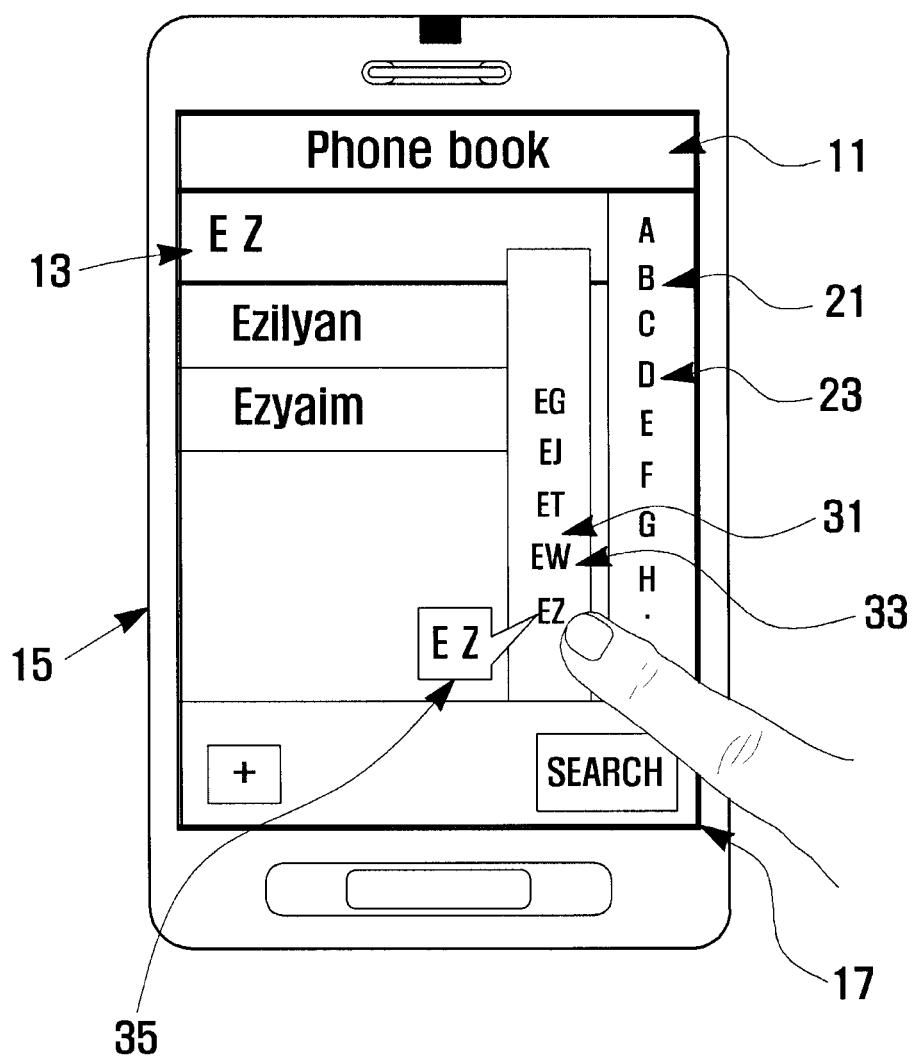
FIG. 3 is a screen that illustrate another form of a search area in FIG. 2 screen sequence.

FIG. 3 illustrates another form of screen "107" depicted in FIG. 2. In FIG. 3, the display unit is shown to include a function name area 11, a list index area 13, a list area 15, and a control key area 17, and may display a first search area 21 including a first index group 23 and a second search area 31 including a second index group 33 in response to a touch event (input) from a user. The mobile terminal displays areas of different layers on one screen without screen switching in the process of displaying the first search area 21 and the second search area 31, thereby providing a user with a quick search and quick information recognition. In one embodiment, the function name area 11, the list index area 13, the list area 15, and the control key area 17 are areas that are displayed in the same first layer, and the first search area 21 and the second search area 31 are areas that are displayed in a second layer different from the first layer. Also, a second popup window 35 may be placed in the second layer, or may be displayed in a separate third layer different from the first and second layers.

When a user of the mobile terminal specifies index "E" in the first search area 21, the mobile terminal generates the second index group 33 from among items having index "E", based on a predetermined condition. That is, the mobile terminal generates the second index group 33 by extracting the second letters or letters corresponding to a designer's order from items having index "E" as their first letters. With regard to this, the mobile terminal displays an index specified in the first search area 21 together in the process of displaying the second index group 33 in the second search area 31. That is, when index "E" is specified in the first search area 21, the second index group 33 may contain indexes including index "E". Accordingly, the user of the mobile terminal can intuitively recognize a plurality of indexes, based on which a list search is currently being conducted. Since the second search area 31 including index information specified in the first search area 21 is displayed, the area thereof may be enlarged. Thus, the mobile terminal may support a menu function for allowing the user to specify index information to be displayed in the second search area 31.

FIG. 4 illustrates an example of a screen for explaining a calendar search function, whereby an input signal for a calendar search is received in a form of a touch event signal generated by a touch event in the touch panel. In FIG. 4, the display unit includes a function name area 11, a first search area 21, a list area 15, a schedule display area 19, and a control key area 17, as illustrated in screen "201".

The function name area 11 is an area for displaying information indicating a currently activated user function, as mentioned above. When a user of the mobile terminal activates a calendar function or a schedule function (hereinafter referred collectively to as "schedule function") through a menu, etc., the function name area 11 displays calendar-related information, for example, "Calendar" text information.

The list area 15 is an area for displaying information corresponding to index information indicated in the first search area 21. When "February" is displayed in the first search area 21, the list area 15 displays a calendar including dates corresponding to "February".

The schedule display area 19 is an area for displaying information stored in a specific list specified in the list area 15. For example, when a user generates a touch event specifying date "28" in the February calendar, the schedule display area 19 displays schedule information stored in date "28". Referring to screen "201", when schedule information, such as "15:40 Movie", is registered on date "28", the information, such as "15:40 Movie", is displayed in the schedule display area 19.

The control key area 17 is an area in which a control key for executing a function linked with an item specified in the list area 15, for example, a function of viewing detailed information on a specified item, a control key corresponding to a confirm button necessary to execute a function of viewing detailed information on other items, etc. are displayed. The control key area 17 may be removed or may be assigned other control keys according to the intention of the designer of the display unit or settings from a user of the mobile terminal.

The first search area 21 is an area for supporting a user's search for a specific month in the schedule function. In screen "201", the index information displayed in the first search area 21, that is, "February", is only a value set as default, and a month to which the date of today belongs is displayed in the first search area 21, or a finally searched month is displayed in the first search area 21 when a user has previously used the calendar function. The first search area 21 is maintained in an inactive state in screen "201". Subsequently, if a touch event is generated in the corresponding area, the first search area 21 may perform image conversion for indicating that other indexes are searchable, as illustrated in screen "203". That is, when a touch event is generated in screen "203", the first search area 21 displays an image indicating that a drag is possible, for example, an arrow symbol, on one side of the corresponding area. If a drag event is generated by a user, the first search area 21 displays other indexes assigned to the first search area 21 in correspondence with a drag distance, speed, direction, or the like. For example, the first search area 21 may display "March" corresponding to March month in screen "203".

When a touch event is generated, the list area 15 displays corresponding calendar information in response to index information changed in the first search area 21. That is, the list area 15 displays calendar information corresponding to "March". Here, in screen "203", the mobile terminal may succeed to item "28" specified in the list area 15 of screen "201", and specify the same date as default. The schedule display area 19 of screen "203" may not display separate information where there is no information registered on date "28", that is, the item specified in the list area 15 of screen "203".

If a user generates a predetermined input signal, for example, a touch event corresponding to "Long Press" for the first search area 21 or a "Release" touch event releasing a previously provided touch down event, in screen "203", the mobile terminal additionally displays a second search area 31, as illustrated in screen "205". Here, the mobile terminal displays the second search area 31 in such a manner as to overlay the list area 15, as illustrated in screen "205". Also, the mobile terminal may remove the list area 15, the schedule display area 19, or the control key area 17 from the display unit, and display the second search area 31 using a vacant area generated due to the removed area. The second search area 31 is displayed adjacent to the first search area 21. Index information displayed in the second search area 31, for example, "2009", indicates the present calendar year set in the mobile terminal.

Similar to the first search area 21 of screen "201", the second search area may be maintained in an inactive state, and then display an image indicating that a touch drag is possible, for example, an arrow symbol, on one side of the corresponding area, as illustrated in screen "207", when a user touches the second search area 31. The second search area 31 displays index information related to other years, assigned according to the direction, distance, and speed of the touch drag event generated by the user. If index information displayed in the second search area 31 is changed in response to a touch event from the user, the mobile terminal may change the list area 15, based on index information displayed in the first search area 21 and the second search area 31 respectively. That is, if the second search area 31 is changed while there is no change in the first search area 21 in screen "207", the mobile terminal determines a calendar to be displayed in the list area 15, based on index information displayed in the first search area 21 and index information displayed in the second search area 31.

As described above, the mobile terminal is configured to conduct a date search without screen switching through a plurality of search areas and simple touch inputs and to support a quick search by processing index information displayed in the first search area 2 and index information displayed in the second search area 31 in a connected manner.

Figure 5A:
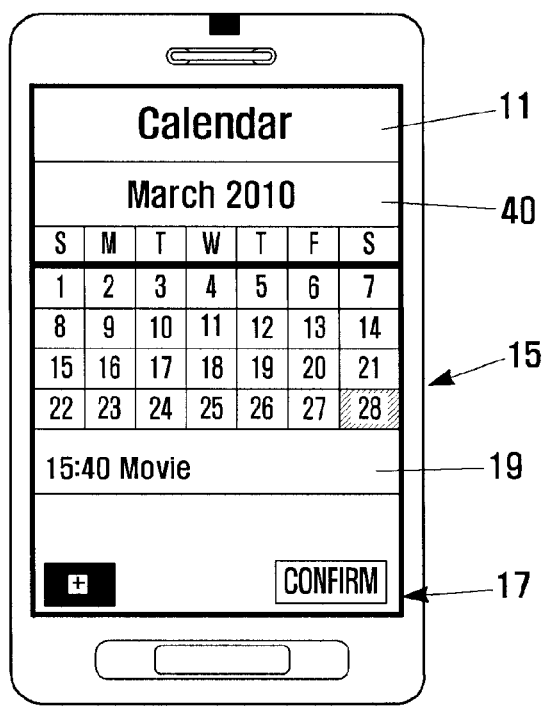
FIGS. 5a and 5b are screen views illustrating variations on search areas included in FIG. 4.
Figure 5B:
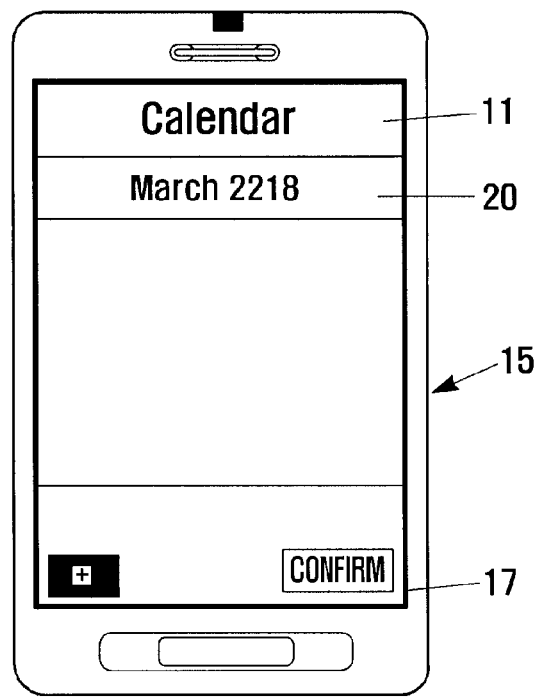

FIGS. 5a and 5b illustrate another example of the calendar interface described in FIG. 4. In FIG. 5a, a screen interface including a mixed search area 40, a list area 15, a schedule display area 19, and a control key area 17 are displayed. Here, the list area 15, the schedule display area 19, and the control key area 17 are the same areas as those illustrated in FIG. 4, and provide similar functions to those of the areas in FIG. 4, so a detailed description thereof will be omitted.

The mixed search area 40 is an area in which results of the first search area 21 and the second search area 31 described above in cooperation with FIG. 4 are displayed together. That is, information displayed in the first search area 21 and information displayed in the second search area 31 of screen "207" as shown in FIG. 4 are displayed together in the mixed search area 40. Here, the above-mentioned screen interface is provided according to user settings, and the mobile terminal displays the two pieces of information, which were displayed in the two search areas, together in the mixed search area 40 when a touch event is released after specific index information is specified in the second search area 31 of screen "207". Alternatively, the mobile terminal configures the mixed search area 40 upon the lapse of a certain time after the touch event is released.

In addition, the mobile terminal may display an image for providing the mixed search area 40 with a search function. That is, if a user generates a touch event at one side of the mixed search area 40, the mobile terminal displays an image indicating that the mixed search area 40 is capable of a touch drag, for example, displays an image in the form of an arrow in left and right edge areas of the mixed search area 40, thereby indicating that an additional index can be specified and selected. The user of the mobile terminal may specify another index, for example, "April 2010", "May 2010", etc., by touching the mixed search area 40 and then generating a touch drag event in a certain direction (e.g. left-and-right direction).

When the user generates a touch event for the mixed search area 40, the mobile terminal returns to screen "207" in FIG. 4, and separately display the first search area 21 and the second search area 31.

Referring to FIG. 5b, when the user specifies a specific index in screen "207", but there is no data for the specified index, the mobile terminal displays image or text information corresponding thereto in the list area 15. For example, if the user specifies March 2218 through the first and second search areas when the mobile terminal has calendar data supporting only up to February 2218 and thus has no data for March 2218, the mobile terminal displays information indicating non-existence of the corresponding data, for example, "Not being", in the list area 15.

Figure 6:
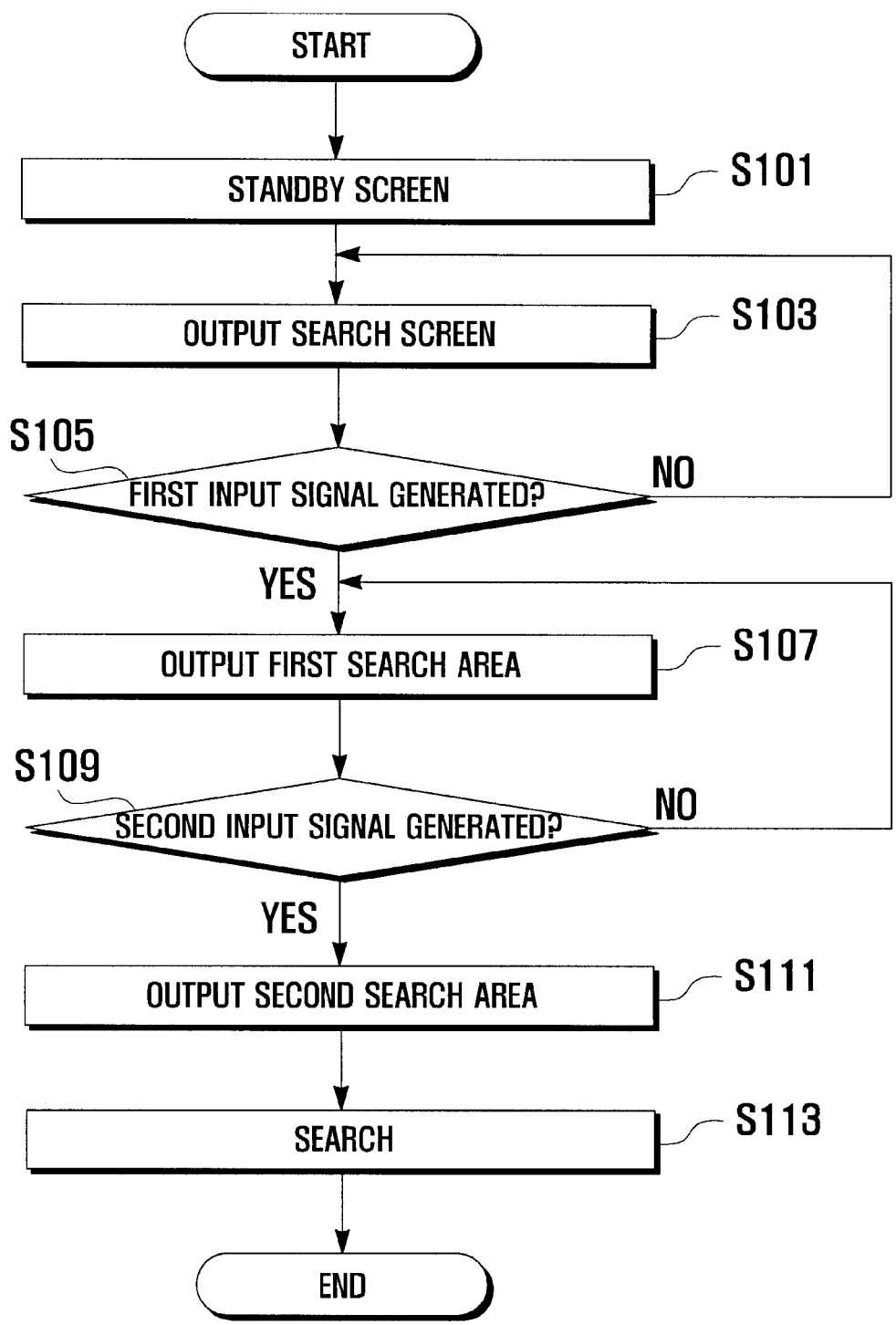
FIG. 6 is a flowchart defining an embodiment of a list search method of the invention.

FIG. 6 illustrates a flowchart defining one embodiment of a list search method of the invention. Referring to FIG. 6 list search method, power is first supplied to the mobile terminal, and the mobile terminal initializes its respective constituent elements, based on the supplied power. Upon completion of the initialization, the mobile terminal may display a predetermined standby screen on the display unit in step S101. When the display unit is activated, the mobile terminal recognizes a user's touch by activating the touch panel according to user settings.

Next, in step S103, the mobile terminal displays a search screen at a user's request. The user selects a menu for displaying a call log screen in order to search specific log information from among call logs, and may also select a menu for displaying a schedule function screen in order to search a specific schedule through a schedule function. Then, the mobile terminal activates a specific user function corresponding to an input signal input by the user, and displays a screen corresponding to the activated user function.

In step S105, the mobile terminal checks if a first input signal is generated. Here, the first input signal is an input signal predetermined for a screen where at least one list is displayed, and may be any one of a touch event from a touch screen, a key input signal from a key input unit, and a motion signal from a motion sensor. When the first input signal is not generated, the mobile terminal returns to a point before step S103, and maintains step S103.

Contrarily, when the first input signal is generated in step S105, the mobile terminal displays a first search area corresponding to the first input signal in step S107. Here, the first search area displays at least one first index group for searching each list in the screen where the at least one list is displayed. Accordingly, the first index group displayed in the first search area includes indexes constituted by a part of information recorded in each list. For example, the indexes may be specific English initials when each list is constituted by English characters, and may be numerals constituting phone numbers when each list corresponds to a phone number. Also, when the at least one list includes special characters or icons, the indexes may be corresponding characters or icons.

When the indexes in the first search area are arranged lengthwise, and a touch drag event in an up-and-down direction or a key input signal or an input signal comparable thereto is generated in order to search each index, the mobile terminal defines a specific index in the first search area in response to the generated input signal. That is, when an input signal in an up-and-down direction is generated, the mobile terminal displays a highlight box or the like indicating a specific index of the indexes arranged lengthwise. Also, once a specific index is specified, the mobile terminal may perform a list arrangement operation, based on the specified index. For example, the mobile terminal may arrange specific lists, such as lists including the specified index or lists having the specified index as their first letters, based on a predetermined condition, and display the arranged lists on the display unit.

After the search area is displayed, the mobile terminal checks in step S109 if a second input signal is generated. When the second input signal is not generated, that is, when an input signal for specifying an index from among the indexes displayed in the first search area is generated, as mentioned above, the mobile terminal may maintain displaying the first search area in step S107 by returning to a point before step S107 while performing list arrangement according to the corresponding input signal. When a separate input signal is not generated within a predetermined period of time after the first search area is displayed, the mobile terminal may return to a point before step S103 and remove the first search area from the display unit.

The second input signal in step S109 is an input signal for displaying a second search area, and different from the input signal for specifying a specific index belonging to the first index group displayed in the first search area. That is, when the input signal for specifying an index from among the indexes displayed in the first search area is a touch drag event in an up-and-down direction, the second input signal is a predetermined "Long Press" touch event or a touch drag event in a left-and-right direction. When the second input signal is generated, the mobile terminal displays the second search area in response to the generated second input signal in step S111. The second search area displays indexes corresponding to a second index group. As mentioned above, the second index group may include indexes set independently of the first index group, or may include indexes linked with the first index group. For example, when the lists are phone numbers, Arabic numerals 0 to 9 are displayed as indexes of the second index group, and the second index group includes Arabic numerals 0 to 9. When the lists are character data, for example, phonebook data, indexes of the second index group are characters indicating the first letters of names, etc. recorded in a phonebook, for example, alphabetic characters, and the indexes of the second index group are alphabetic characters corresponding to the second letters of names, etc. recoded in the phonebook. Here, the second index group includes alphabetic characters linked with an index selected in the first index group, that is, alphabetic characters corresponding to the second letters of lists, the first letters of which contain an index selected in the first index group. To this end, if a specific index is selected in the first index group, the mobile terminal first extract lists including the corresponding index, and displays the extracted lists in the display unit. Also, if the user generates an input signal for generating the second search area, the mobile terminal extracts the second letters of the extracted lists, and generates the second index group, based on the extracted letters. If the user of the mobile terminal specifies a specific index in the second index group, the mobile terminal extracts lists including the specified index and displays the extracted lists on the display unit.

Although two search areas and two index groups have been described by way of example, the present invention is not limited thereto. That is, the mobile terminal may display a greater number of search areas and may display index groups corresponding thereto. For example, when indexes of the second index group in the second search area are arranged lengthwise, the mobile terminal displays a mixed search area including a third index group linked with a specific index specified in the second index group when a predetermined input signal, for example, a touch drag in a left-and-right direction, is generated after the specific index is specified. In an exemplary case where this is applied to a phonebook search, the mobile terminal specifies an index corresponding to the first letter in the first search area, an index corresponding to the second letter in the second search area and an index corresponding to the third letter in the mixed search area. The mobile terminal then displays phonebook lists having the respective specified indexes as their first, second, and third letters on the display unit. Therefore, the user of the mobile terminal can quickly and easily search a desired specific list by repeating these steps.

Figure 7:
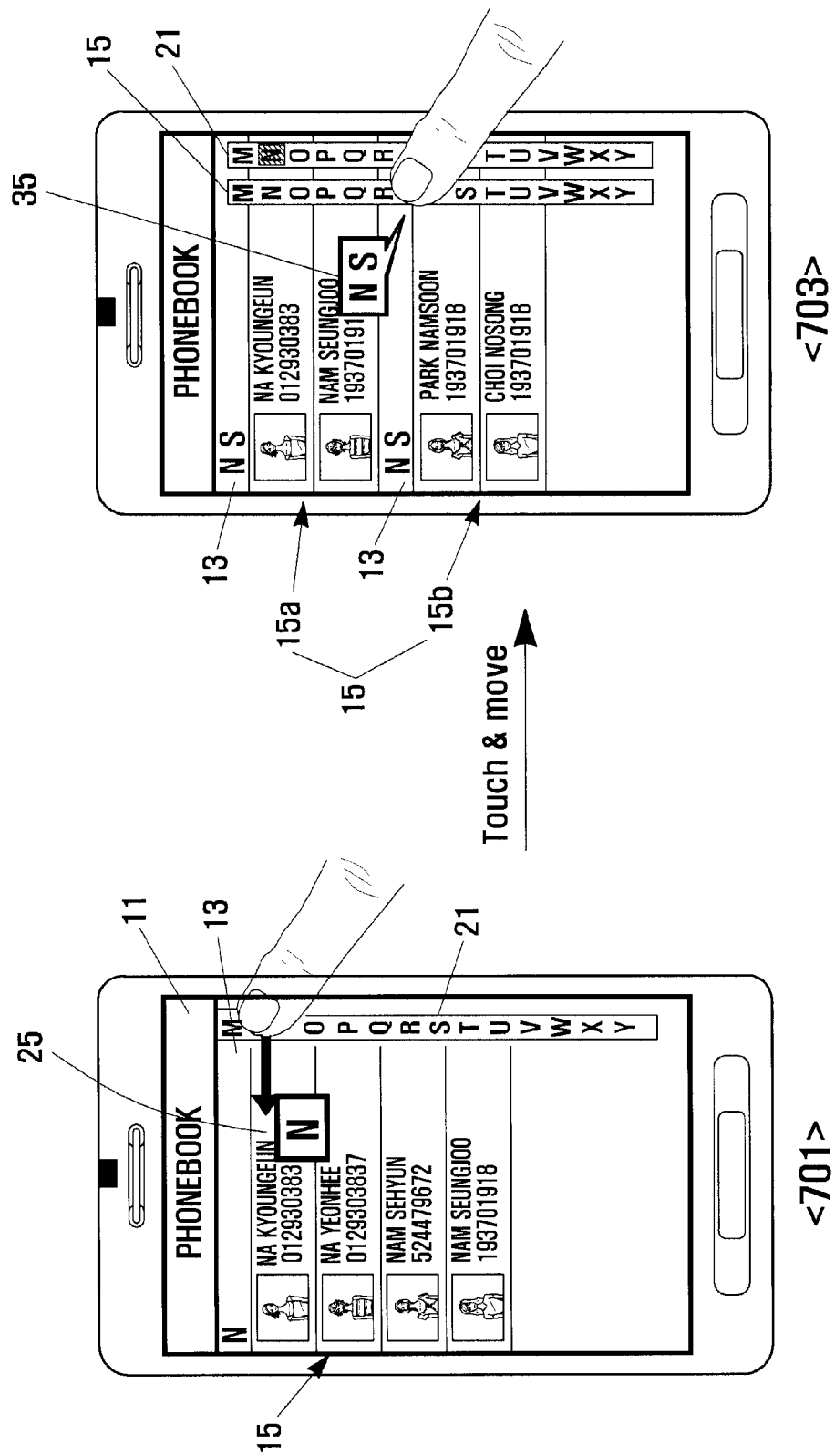
FIG. 7 is views illustrating a Korean list search procedure according to an embodiment of the invention.

FIGS. 7 to 10 illustrate various examples of a screen interface in various cases implemented by the list search method. FIG. 7 illustrates a screen interface for explaining a list search method for data including Korean lists, including use of an input signal for displaying and controlling a search area.

In FIG. 7, a function name area 11, a list index area 13, a list area 15, and a control key area 17, are illustrated in screen "701". If a predetermined input signal or a touch event of a predetermined type is generated, the mobile terminal displays a first search area 21, as illustrated in screen "701". Here, lists created based on the Korean alphabet may be arranged in the list area 15. That is, in a case where phonebook lists are written in the Korean alphabet, the mobile terminal configures a first index group for a first search area 21, based on consonants that are constituents of Korean letters, when a touch event for displaying the first search area 21 is generated. Accordingly, consonants, such as "M, N, O, P, . . . ", are displayed in the first search area 21. When a user selects an index corresponding to "N", the mobile terminal displays "N" in the list index area 13 and items including "N" among lists stored in a phonebook. For more clear recognition of the selected index, the mobile terminal displays a separate first popup window 25, and displays the index in the first popup window 25 while changing at least one of the size and color of the index. Also, the mobile terminal extracts lists having a character, the initial sound of which is pronounce with "N" and displays the extracted lists on the display unit.

If the user generates an input signal for displaying a second search area 31, for example, a touch drag or a touch move in a left-and-right direction, after specifying "N" in the first search area 21, the mobile terminal displays the second search area 31, as illustrated in screen "703". The second search area 31 includes a second index group that is the same as the first index group. That is, the second index group contains consonants, such as "M, N, O, P, . . . ". As mentioned above, the second index group displays predetermined indexes independently of the first index group and indexes linked with an index selected in the first index group. If the user of the mobile terminal defines a specific index, for example, index "S", in the second index group, the mobile terminal extracts lists including index "N" specified in the first search area 21 and index "S" specified in the second search area 31, and displays the extracted lists in the list area 15. With regard to this, the mobile terminal displays different results according to the arrangement order of letters recorded in the lists including the specified indexes. More specially, the mobile terminal displays lists that include the specified indexes from the head portion in the arrangement order of letters thereof, as illustrated in a first list area 15 (upper list area of screen "703"), and alphabetically output lists including the specified indexes regardless of the arrangement order of letters thereof, as illustrated in a second list area 15 (lower list area of screen "703"). According to user settings and so forth, the mobile terminal displays only one of the first list area 15 and the second list area 15 that are different in the criteria for applying specified indexes to lists, or displays both of them, as illustrated in screen "703".

For easier recognition of a plurality of specified indexes, the mobile terminal opens a second popup window 35, and displays the specified indexes in the second popup window 35 while changing at least one of the sizes and colors of the specified indexes.

Figure 8:
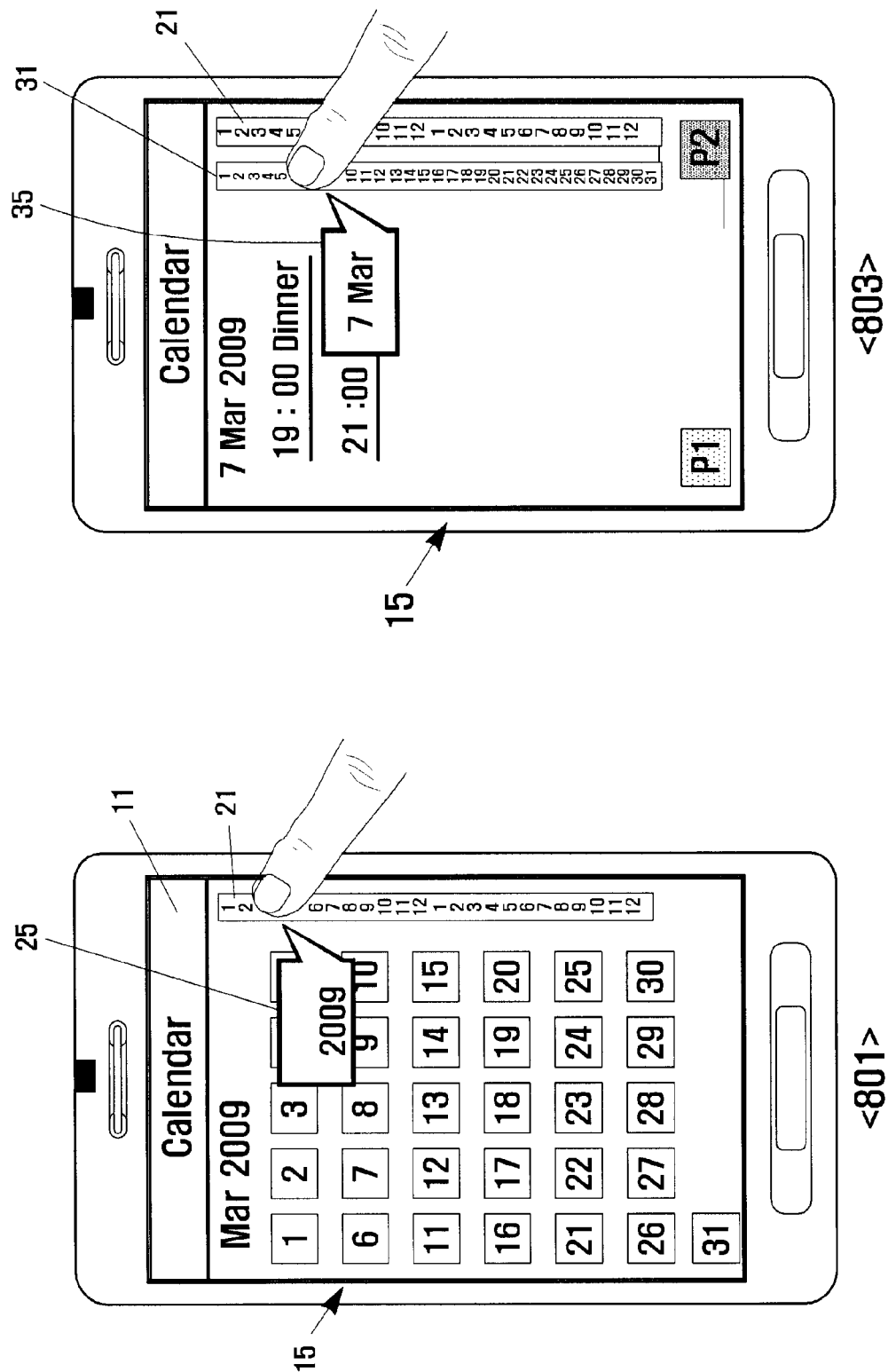
FIG. 8 is views illustrating a calendar list search procedure according to an embodiment of the invention.

FIG. 8 illustrates a screen interface for explaining a schedule list search method according to an exemplary embodiment of the present invention.

Referring to FIG. 8, the invention includes a function name area 11 and a list area 15, as illustrated in screen "801", where upon detection of a signal associated with a predetermined touch event, a first search area 21 is displayed on one side of the display unit where the list area 15 is displayed. For example, when a user of the mobile terminal selects a menu for activating a schedule function, the mobile terminal activates the schedule function corresponding to the selected menu, and displays date information corresponding to a specific month as default in the list area 15. Here, the first search area 21 displays indexes through which months of the year 2009 can be selected for a schedule search, for example, indexes "1, 2, 3, 4, . . . , 11, and 12". Also, the first search area 21 repeatedly displays indexes "1, 2, 3, 4, . . . , 11, and 12" next to the indexes of the year 2009 so that months of the year 2010 can be searched. That is, indexes 1 to 12 starting from the top of the first search area 21 in a lengthwise direction may indicate months of the year 2009, and indexes 1 to 12 following December 2009 may indicate months of the year 2010.

When the user inputs a specific index in the first search area 21, the first popup window 25 changes the size and color of the index selected in the first search area 21, as well as the shape of the selected index, and displays the changed index in order for the user to exactly confirm information corresponding to the specified month. That is, when the user specifies an index corresponding to "3", the first popup window 25 displays some letters of calendar information assigned to "3", that is, "March". In addition, the first popup window 25 displays some letters together with the year of the specified index, that is, displays "March 2009". When the user specifies a month assigned to the year 2010, that is, any one if indexes displayed in the lower portion of the first search area, the first popup window 25 displays information including "2010".

If the user generates a predetermined input signal, for example, a touch drag or touch move event in a left-hand direction, in a state where he/she specifies "3" in the first search area 21, the mobile terminal displays a second search area 31 including dates corresponding to March 2009 as indexes, as illustrated in screen "803". That is, the second search area 31 displays numerals corresponding to the 1st to the 31st of March. When the user specifies a specific date in the second search area 31, month information corresponding to the second search area and date information corresponding to the specific date specified by the user is displayed in a second popup window 35 in order for the user to more clearly recognize the corresponding month and date. For example, the second popup window 35 removes "2009" from the information displayed in the first popup window 25, and displays "7 Mar" including newly specified index information. Also, when schedule information is registered on the 7th of March 2009, the mobile terminal displays the registered schedule information in the list area 15.

As described above, in searching schedule information, the mobile terminal displays the first search area 21 through a touch down event, specifies an index through a touch drag event in a first direction, displays the second search area 31 through an additional touch drag event in a second direction and specifies an index through a touch drag event in the first direction, thereby making it possible for a user to easily search schedule information of a desired date. That is, the mobile terminal can quickly and easily conduct a desired date search only by simple touch and drag events.

Figure 9:
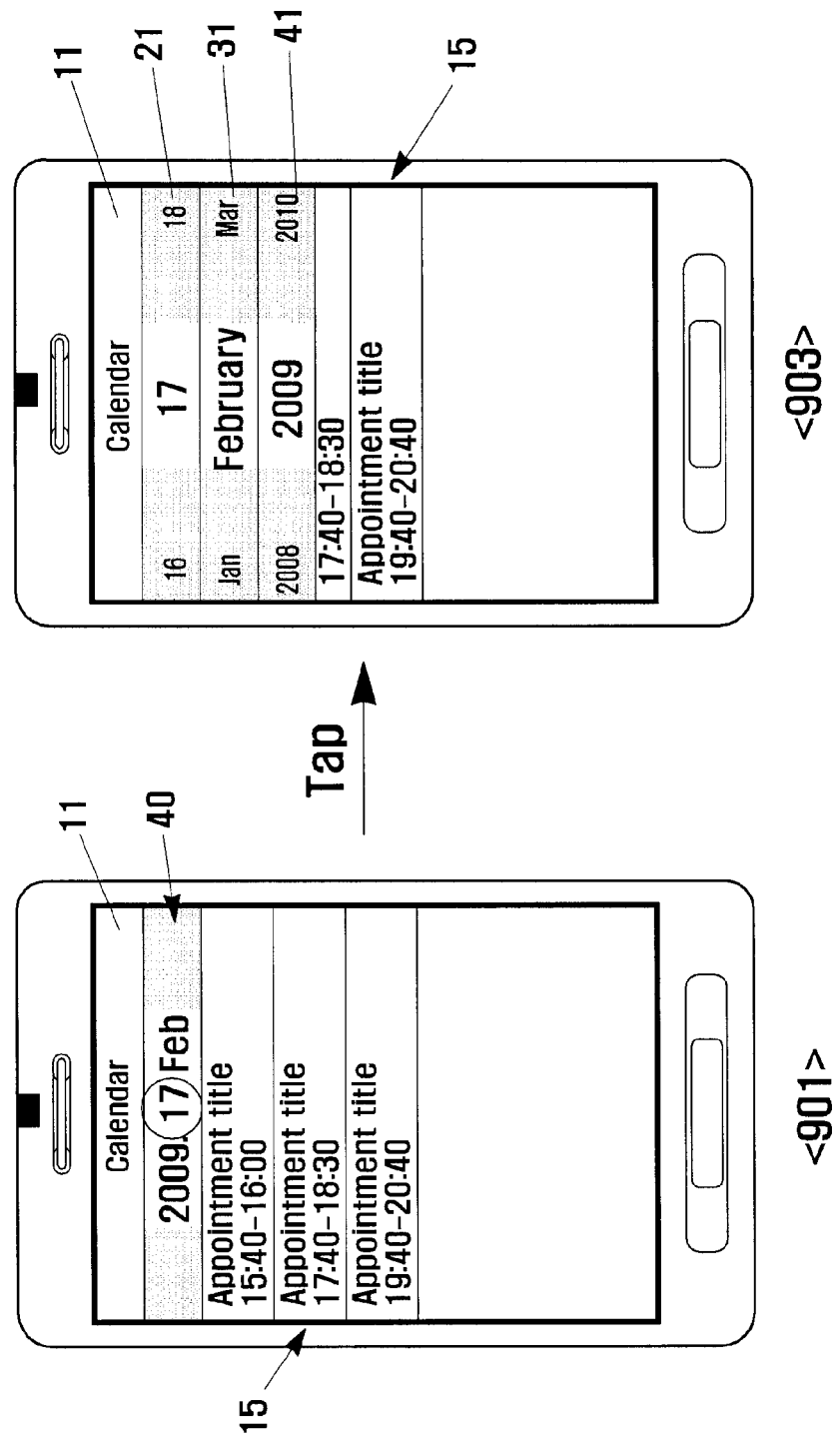
FIG. 9 is views illustrating a mixed search area according to an embodiment of the invention.

FIG. 9 illustrates a screen interface for explaining a schedule list search method of the invention.

In FIG. 9, highlight steps for configuring a display unit screen including a function name area 11, a mixed search area 40, and a list area 15. The mixed search area 40 is an area for displaying a plurality of indexes belonging to different categories. For example, the mixed search area 40 may display date information "2009 17 Feb", as illustrated in screen "901".

The list area 15 is an area for displaying schedule lists of a searched date, based on a plurality of indexes searched in the mixed search area 40. When there are no schedule lists registered on a corresponding date, the list area 15 displays information indicating this fact, or displayed a background screen with no contents.

When a user of the mobile terminal generates a touch event in a certain portion of the mixed search area 40, the mobile terminal displays a plurality of search areas, each of which independently includes each of the indexes belonging to different categories displayed in the mixed search area, as illustrated in screen "903'. That is, the mobile terminal displays a first search area 21 capable of a date search, a second search area 31 capable of a month search, and a third search area 42 capable of an year search. Here, in order for the user to easily recognize that a date search is possible, the first search area 21 places the date information displayed in the mixed search area in the center and displays indexes, which are adjacent to the center date information in order of date, on the left and right sides. For example, when "17" is displayed in the center of the first search area 21, "16" and "18" are displayed on the left and right sides of the first search area 21, respectively. Here, the left and right sides of the first search area 21 are distinguished from the center by having a different color from that of the center, and each numeral displayed in the left and right sides of the first search area 21 is smaller in size than that displayed in the center. In the same manner, index information "February" corresponding to the month of February, displayed in the second search area 31, is disposed in the center of the search area, and "Jan" and "Mar" corresponding to the months of January and March, which are indexes adjacent to February month in order of date, are displayed with a smaller letter size than that of "February" on the left and right sides of the second search area 31, respectively. Here, "February" displayed in the second search area 31 is the index displayed as "Feb" in the mixed search area 40. That is, an index displayed as a full word in the second search area 31 is displayed as an abbreviated word in the mixed search area 40. Similar to other search areas, year "2009" is disposed in the center of the third search area 41, and years "2008" and "2010" are displayed with a different size on the left and right sides of the third search area 41, respectively.

When the mobile terminal provides one search area in screen "901", and then displays three search areas in screen "903", the increased search areas may temporarily overlap with the list area 15. When the user does not generate a separate input signal for a certain period of time, or generates a predetermined input signal, the mobile terminal may collect the indexes displayed in the first, second, and third search areas 21, 31, 41, and display the collected indexes in the mixed search area 40, as illustrated in screen "901".

Figure 10:
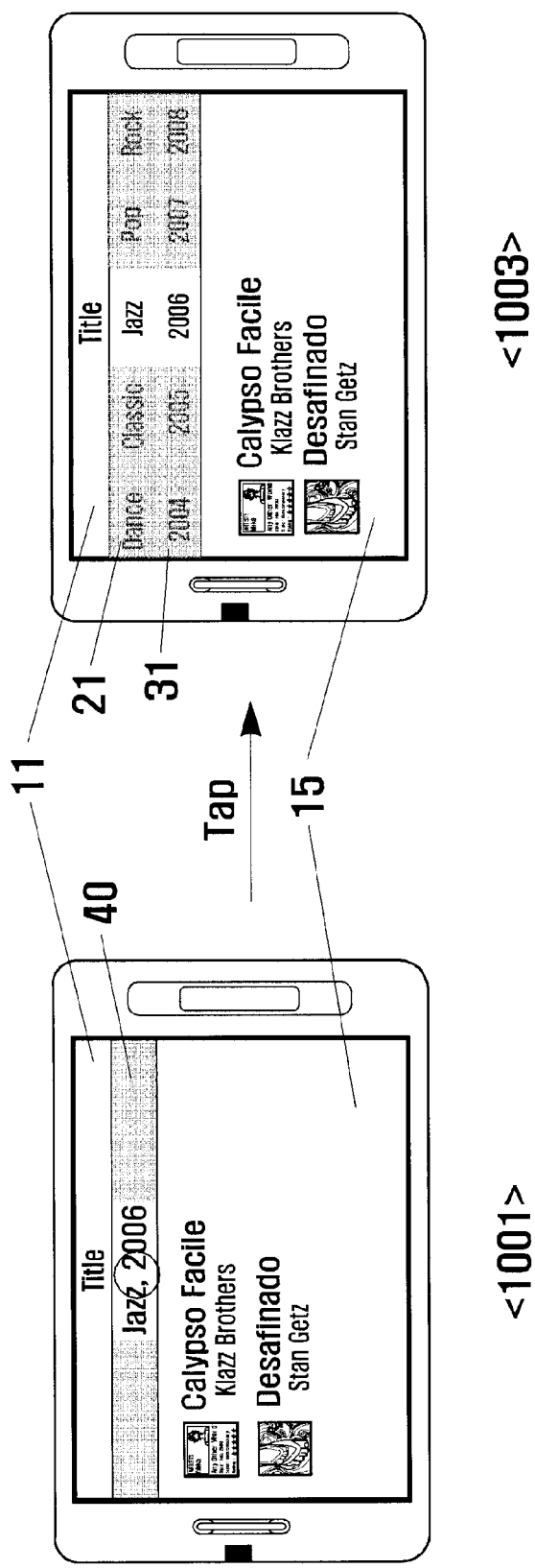
FIG. 10 is views illustrating a file list search procedure according to an embodiment of the invention.

FIG. 10 illustrates a screen interface for explaining an embodiment of a file list search method. In FIG. 10 shows a display unit screen including a function name area 11, a mixed search area 40, and a list area 15. The function name area 11 is an area for displaying a title corresponding to a user function activated so as to configure the current display unit screen, for example, "music reproduction" or "file reproduction". The mixed search area 40 is an area for displaying a plurality of indexes belonging to different categories together. In screen "1001", the mixed search area 40 displays indexes corresponding to a genre and a year related to a file to be reproduced. The list area 15 is an area for displaying lists to which indexes displayed in the mixed search area 40 are collectively applied. That is, each of "Calypso Facile" and "Desafinado" displayed in the list area 15 may be a file or an album file related to Jazz of the year 2006.

When a user of the mobile terminal generates a touch event at one side of the mixed search area 40, the mobile terminal may separate the mixed search area 40 into a first search area 21 and a second search area 31, and display the separated first and second search areas 21, 31, as illustrated in screen "1003". The first search area 21 is an area for supporting a search for any one of indexes displayed in the mixed search area 40. For example, the first search area 21 supports a search for genres other than the genre displayed in the mixed search area of screen "1001", that is, "Jazz". To this end, the first search area 21 may place indexes "Dance, Classic, Pop, Rock, etc." on left and right sides with respect to "Jazz" respectively. The areas in which to display indexes "Dance, Classic, Pop, Rock, etc." may be distinguished from the area, in which "Jazz" is displayed, by having a different background color or differing the size or color of the displayed indexes. The second search area 31 is an area for supporting a search for indexes other than index "2006" displayed in the mixed search area 40. That is, indexes "2004, 2005, 2006, 2007, etc." may be disposed in certain positions in the second search area 31. As the mixed search area 40 is enlarged to the first search area 21 and the second search area 31 in screen "1003", a certain portion of the list area 15 may be removed.

As described above, the list search method supports an easy list search by providing a plurality of search areas for various lists, can easily catch search values of a query by displaying a plurality of search areas in one mixed search area, and can provide a quick and easy search by supporting an additional search through the mixed search area.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

What is claimed is:

1. A list search method, operable in a processor within a mobile terminal, the method comprising:
　　displaying a list area on a display screen of a display unit, the list area including at least a part of at least one list;
　　receiving an input signal for searching a specific list of the at least one list; and
　　in response to the received input signal, displaying a plurality of search areas, each of which including an index group having at least one index for searching the specific list, on the display screen with the at least part of at least one list displayed thereon, wherein displaying the plurality of search areas further comprises:

displaying a first search area including a first index group; and displaying at least one additional search area including a specific index group whenever at least one predetermined input signal is generated.

2. The list search method of claim 1, wherein receiving the input signal further comprises:
receiving at least one of a predetermined touch event from a touch screen, a predetermined key input signal from a key input unit and a predetermined motion signal from a motion sensor, for displaying the first search area; and
generating at least one of a touch drag event, a direction key input signal and a direction-indicating motion signal for displaying the at least one additional search area, which are generated by movement in a direction other than in a direction for searching a first index group included in the first search area, or generating a touch down event for at least a predetermined period of time in the first search area.

3. The list search method of claim 1, wherein outputting the plurality of search areas further comprises:
generating the input signal in the first search area; and
in response to the generated input signal, displaying the additional search area adjacent to the first search area.

4. The list search method of claim 1, further comprising:
specifying a first index in the first area; and
configuring a specific index group, based on lists related to the specified first index,
wherein the specific index group includes at least one index extracted from lists including the first index in the at least one list.

5. The list search method of claim 1, wherein displaying the list area further comprises:
when a first index is specified in the first search area, extracting lists including the specified index; and
displaying at least a part of the extracted lists on the display unit.

6. The list search method of claim 5, further comprising displaying a first popup window for displaying the first index specified in the first search area.

7. The list search method of claim 6, wherein, when a touch event for specifying an index included in the first index group moves, the first popup window moves along with a movement of the touch event.

8. The list search method of claim 6, further comprising displaying a second popup window for displaying an index specified in the additional search area.

9. The list search method of claim 8, wherein the second popup window displays the first index and the index specified in the additional search area together and, the first index and the index specified in the additional search area are different in at least one of size, color, and uppercase/lowercase form.

10. The list search method of claim 9, wherein, when a touch event for specifying an index in the additional search area moves, the second popup window moves along with a movement of the touch event.

11. The list search method of claim 1, wherein displaying the list area further comprises any one of:
when an index is specified in the additional search area, extracting lists including the specific index from among the extracted lists and displaying at least a part of the lists including the specific index on a display unit; and
when an index is specified in the additional search area, extracting lists including both an index specified in the first search area and the index specified in the additional search area and displaying at least a part of the extracted lists on the display unit.

12. The list search method of claim 1, further comprising:
displaying a mixed search area where indexes specified in the first search area and the additional search area respectively are displayed within one area at one side of a display unit with the list area displayed thereon; and
when a predetermined input signal is generated, displaying search areas divided according to respective indexes included in the mixed search area.

13. A list search method, operable in a processor within a mobile terminal, the method comprising:
displaying a list area on a display screen of a display unit, the list area including at least a part of at least one list;
receiving an input signal for searching a specific list of the at least one list; and
in response to the received input signal, displaying a plurality of search areas, each of which including an index group having at least one index for searching the specific list, on the display screen with the at least part of at least one list displayed thereon,
wherein displaying a list area comprises at least one of:
displaying a calendar according to a schedule function;
displaying a phonebook list including an English index or a Korean index; and
displaying a list of stored files,
wherein a first index group included in a first search area of the plurality of search areas includes at least one English letter, at least one Korean consonant, and at least one numeral, and
wherein a second index group included in an additional search area output from among the plurality of search areas in response to a predetermined input signal after the first search area is displayed includes the same indexes as those of the first index group or indexes extracted from lists including an index specified in the first index group under a predetermined condition.

14. A mobile terminal configured for supporting a list search, comprising:
a storage unit for storing at least one list;
a display unit for displaying on a display screen a list area including at least a part of the at least one list;
a touch screen for generating a touch event signal in response to an input for searching a specific list of the at least one list; and
a control unit for receiving the touch event signal for searching the specific list of the at least one list, which in response to the received touch event signal, controls the mobile terminal to display a plurality of search areas, each of which including an index group having at least one index for searching the specific list, on the display screen upon which the at least one list is displayed,
wherein the control unit controls the mobile terminal to display a first search area having a first index group on the display screen in response to a first touch event, display at least one additional search area having a specific index group whenever at least one touch event is generated and display the at least one additional search area adjacent to the first search area and a previously displayed additional search area.

15. The mobile terminal of claim 14, wherein, when a first index is specified in the first search area, the control unit controls the mobile terminal to configure the specific index group, based on lists related to the specified index, wherein the specific index group includes at least one index extracted from lists including the first index in the at least one list.

16. The mobile terminal of claim 14, wherein, when a first index is specified in the first search area, the control unit controls the mobile terminal to extract lists including the specified index, and display at least a part of the extracted lists; and when a second index is specified in an additional search area, the control unit controls the mobile terminal to extract lists including the second index from among lists extracted based on a first index, and display at least a part of the extracted lists, or newly extract lists including both first and second indexes in the at least one list, and display the newly extracted lists.

17. The mobile terminal of claim 16, wherein the display unit displays at least one of:

a first popup window displaying the first index specified in the first search area and moving along with a movement of a touch event that moves into the first search area;

a second popup window displaying an index specified in the additional search area, and moving along with a movement of a touch event that moves into the additional search area; and a second popup window displaying an index specified in the additional search area and the first index together, and moving along with a movement of a touch event that moves into the additional search area, the first index and the index specified in the additional search area being different in at least one of size, color, and uppercase/lowercase form.

18. A mobile terminal configured for supporting a list search, comprising:

a storage unit for storing at least one list;

a display unit for displaying on a display screen a list area including at least a part of the at least one list;

a touch screen for generating a touch event signal in response to an input for searching a specific list of the at least one list; and a control unit for receiving the touch event signal for searching the specific list of the at least one list, which in response to the received touch event signal, controls the mobile terminal to display a plurality of search areas, each of which including an index group having at least one index for searching the specific list, on the display screen upon which the at least one list is displayed, wherein, when a separate touch event is not generated for a certain period of time, the control unit controls the mobile terminal to display indexes specified in the plurality of search areas respectively within one area, and when a predetermined touch event is generated, display search areas that are searchable according to the respective indexes included within one area.

\* \* \* \* \*